United States Patent [19]

Morishita

[11] Patent Number: 4,940,102
[45] Date of Patent: Jul. 10, 1990

[54] MOTOR-DRIVEN POWER STEERING SYSTEM

[75] Inventor: Mitsuharu Morishita, Himeji, Japan

[73] Assignee: Mitsubishi Denki Kabushiki Kaisha, Tokyo, Japan

[21] Appl. No.: 245,437

[22] PCT Filed: Nov. 30, 1987

[86] PCT No.: PCT/JP87/00927
§ 371 Date: Sep. 20, 1988
§ 102(e) Date: Sep. 20, 1988

[87] PCT Pub. No.: WO88/04250
PCT Pub. Date: Jun. 16, 1988

[30] Foreign Application Priority Data
Dec. 2, 1986 [JP] Japan .................. 61-288436

[51] Int. Cl.⁵ .............................................. B62D 5/04
[52] U.S. Cl. ................................................ 180/79.1
[58] Field of Search ............... 180/79.1, 142, 143; 74/388 PS

[56] References Cited
U.S. PATENT DOCUMENTS
3,739,738 6/1973 Cavil .................................. 180/79.1
4,573,545 3/1986 Kalns ................................. 180/79.1
4,621,327 11/1986 Dolph et al. ...................... 180/79.1

FOREIGN PATENT DOCUMENTS
0141626 10/1984 European Pat. Off. .
0174137 8/1985 European Pat. Off. .
2170763A 2/1985 United Kingdom .

OTHER PUBLICATIONS
European Search Report, Jun. 7, 1989, EP 87 90 7827.

Primary Examiner—Charles A. Marmor
Assistant Examiner—Richard Camby
Attorney, Agent, or Firm—Sughrue, Mion, Zinn, Macpeak & Seas

[57] ABSTRACT

A motor-driven power steering system equipped with a control unit (9) which controls the turn of a DC motor (13) as an auxiliary steering force on the basis of a steering torque signal from a steering torque sensor (2) that detects the rotational force of a steering wheel (1) and on the basis of a vehicle-speed signal from a vehicle-speed sensor (10), and which turns an electromagnetic clutch (16) on or off in order to effectively or ineffectively control the rotational force of the DC motor (13) as the auxiliary steering force. Further provided is a fail-safe relay (91) having a normally open contact (91b) on a line for supplying power to the electromagnetic clutch (16). Under an abnormal condition such as breakage in the power source wiring, the electromagnetic clutch (16) is shut off because of no energization of the fail-safe relay (91), and no auxiliary steering force is applied by the DC motor (13).

7 Claims, 2 Drawing Sheets

MOTOR-DRIVEN POWER STEERING SYSTEM

FIELD OF THE INVENTION

This invention relates to a motor-driven power steering system for use, in applying auxiliary steering force to an automobile vehicle steering device through the rotation force of the motor.

DESCRIPTION OF THE PRIOR ART

In conventional systems of this type, a normally open contact of a fail-safe relay is disposed on a (+) power supply line common to both a direct current motor (hereinafter referred to as DC motor) to be driven so as to apply an auxiliary steering force to a steering device, and an electromagnetic clutch for making the rotation force of the DC motor effective and ineffective. In case of abnormality, the fail-safe relay is de-energized so that its normally open contact which has been closed is opened, whereby both the DC motor and the electromagnetic clutch are simultaneously disconnected from the common power supply thereof. The conventional motor driven power steering system, being of such arrangement as above described, involves a problem that in the case where a short-circuit trouble occurs with power transistors, power MOS.FET, and the like which drive the DC motor by determining the direction of current flow in the motor or otherwise, a lock current for the DC motor must be cut off at the normally open contact. For this reason, the normally open contact of the fail-safe relay is necessarily of a large volume. This naturally means that the fail-safe relay is of a large size, of a large volume, and of high cost. Another difficulty is the possibility of power loss being caused due to a voltage drop resulting from the normally open contact. A further difficulty is that if the normally open contact is of a large capacity, the opening and closing results in fusion of the contact, which poses a problem in respect of safety.

This invention is intended to overcome the foregoing difficulties. The first object thereof is to provide a motor-driven power steering system which can use a fail-safe relay of a small capacity and which provides a high degree of safety.

SUMMARY OF THE INVENTION

A motor-driven power steering system according to the present invention is provided with a fail-safe relay having a normally open contact which is disposed on a line for supplying power to an electromagnetic clutch adapted to make the rotational force of a DC motor effective or ineffective as an auxiliary steering force, whereby a drive coil of the fail-safe relay is controlled to be energized and de-energized through fail-safe drive means on the basis of steering torque and vehicle speed signals. According to this arrangement the fail-safe relay can be of a smaller size and a smaller capacity, since the normally open contact of the fail-safe relay simply operates only to turn on and off the electromagnetic clutch.

MOST PREFERRED EMBODIMENTS FOR ENFORCING INVENTION

One embodiment of the invention will now be described with reference to the accompanying drawings.

Figure 1:
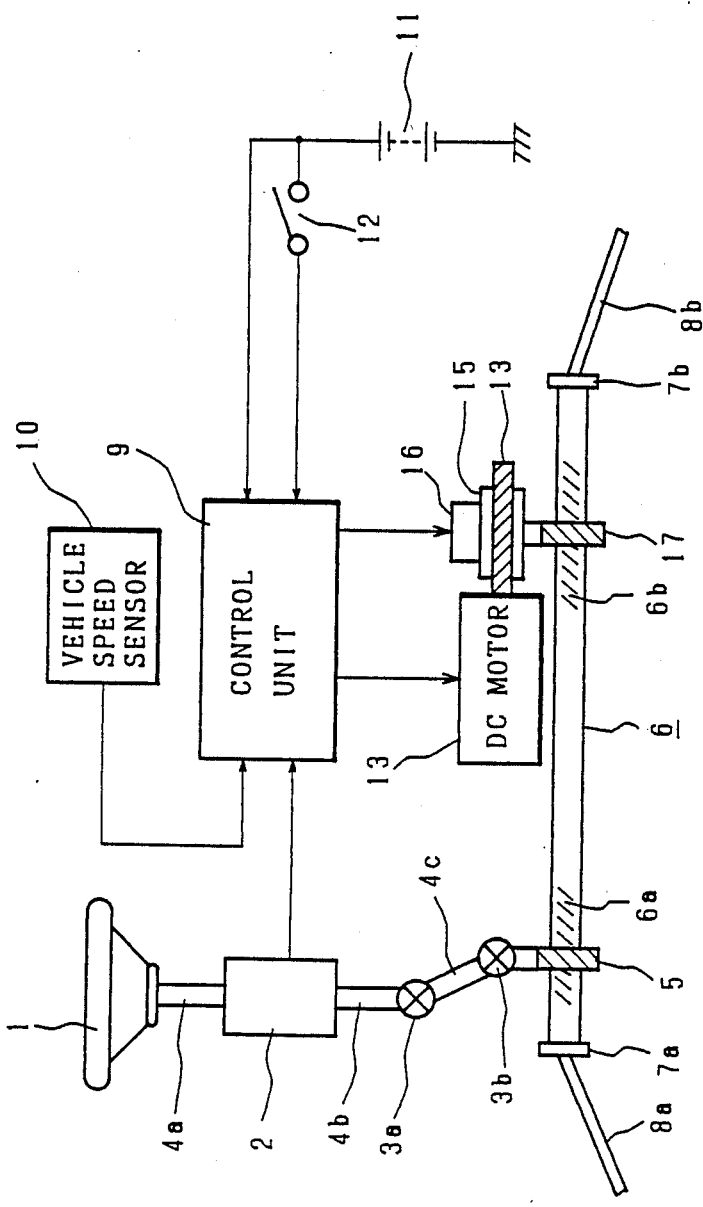
FIG. 1 is a schematic diagram showing the arrangement of one embodiment of the invention.

In FIG. 1, reference numeral 1 designates a steering wheel 1 which receives the steering rotational force of the driver; 2 is a steering torque sensor which outputs an electric signal corresponding to the rotational force applied to the steering wheel; 3a is a first universal joint; 3b is a second universal joint; 4a is a first steering shaft interconnecting the steering wheel 1 and the steering torque sensor 2; 4b is a second steering shaft interconnecting the steering torque sensor 2 and the first universal joint 3a; and 4c is a third steering shaft interconnecting the first and second universal joints 3a, 3b. Numeral 5 is a first pinion shaft connected to the second universal joint 3b; 6 is a rack shaft having a first rack tooth portion 6a and a second tooth portion 6b, these portions having been machined simulataneously with or separately from each other and being engageable with the first pinion shaft 5; 7a is a ball joint connecting one tie rod 8a with one end of the rack shaft 6; and 7b is another ball joint connecting another tie rod 8b with the other end of the rack shaft 6. Numeral 9 is a control unit which will be described in detail hereinafter with reference to FIG. 2; 10 is a vehicle speed sensor; 11 is a battery; 12 is a key switch connected in series to the battery 11; 13 is a DC motor having a shunt winding or a permanent field magnet; 14 is a worm shaft integral with or connected to the DC motor 13 and constituting the higher speed side of a reduction gear; 15 is a worm wheel shaft driven in mesh with the worm shaft 14; and 16 is an electromagnetic clutch capable of electrically controlling mechanical engagement and disengagement between the worm wheel 15 and a second pinion shaft 17 engageable with the second tooth portion 6b of the rack shaft 6 is accordance with an instruction from the control unit 9. The control unit 9 has input terminals connected indiviually to an output terminal of the steering torque sensor 2, an output terminal of the vehicle speed sensor 10, and to a (+) terminal of the battery 11 through the key switch 12, and has also an output terminal connected to an input terminal of the DC motor 13 to control the rotation of the DC motor 13.

Figure 2:
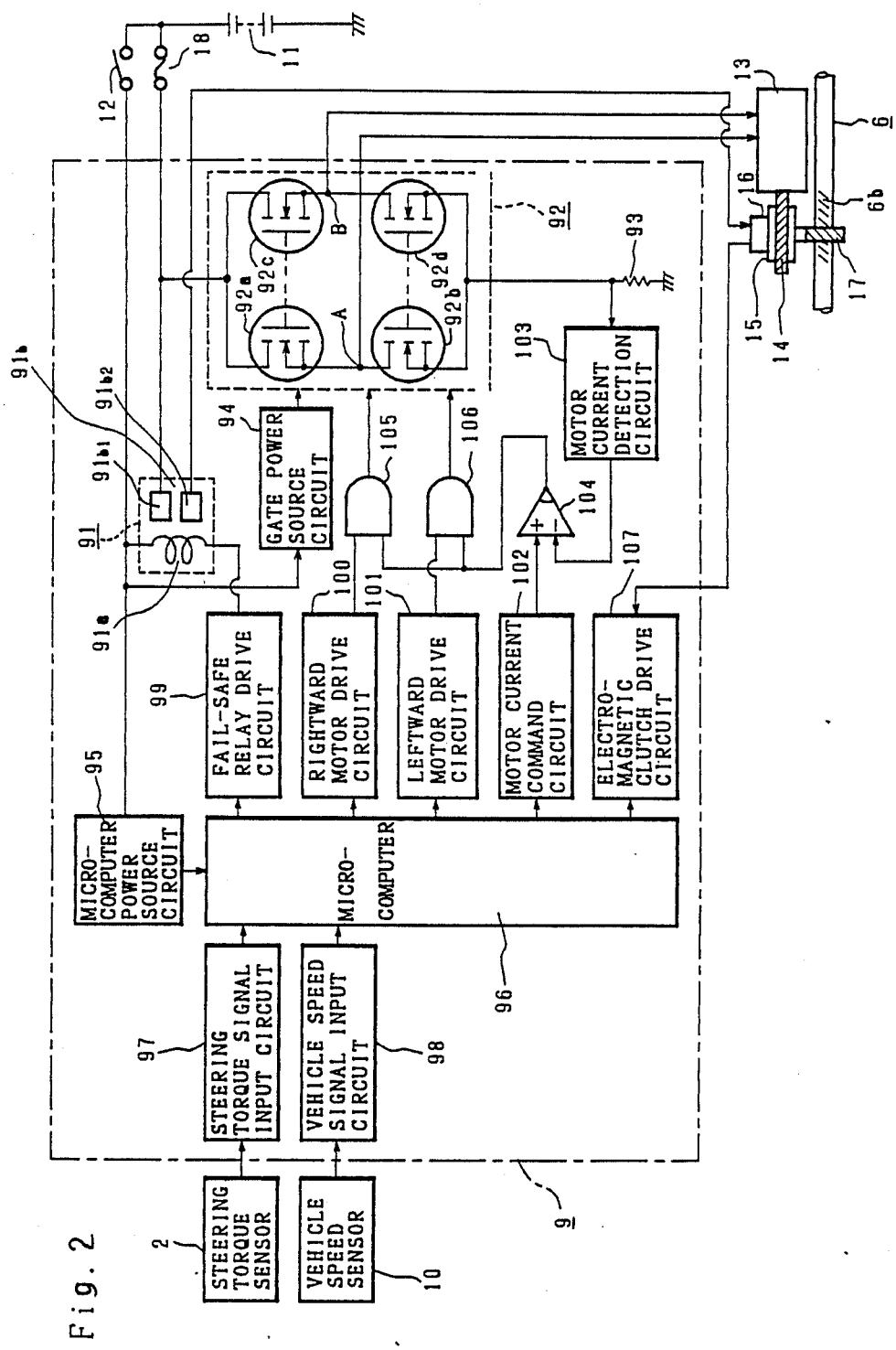
FIG. 2 is a schematic diagram showing the example of the arrangement of the control unit shown in FIG. 1.

FIG. 2 illustrates the internal arrangement of the control unit 9 in detail. In FIG. 2 numeral 91 designates a fail-safe relay having a drive coil 91a connected at one end to the (+) terminal of the battery 11 through the key switch 12, and a normally open contact 91b consisting of one contact 91b$_1$, connected to the (+) terminal of the battery 11 through a fuse 18 and another contact 91b$_2$ connected to an input terminal of the electromagnetic clutch 16; and numeral 92 designates a power motor drive circuit or MOS.FET unit consisting of four N-channel type power MOS.FET's 92a–92d which receives power supply from the battery 11 through the fuse 18 and operates to interrupt current flow to the DC motor 13 and make a polarity changeover. Drains of the first and third MOS.FET's 92a, 92c are connected to each other so that they are connected through the fuse 18 to the (+) terminal of the battery 11, and sources of the second and fourth MOS.FET's 92b, 92d are connected to each other and grounded through a shunt resistance 93. The drain of the first MOS.FET 92a and the source of the second MOS.FET 92b are connected to each other at point A, while the drain of the third MOS.FET 92c and the source of the fourth MOS.FET 92d are connected to each other at point B. The points A and B are respectively connected to opposite ends of a coil of the DC motor 13. Numeral 94 is a gate power source circuit which receives power supply from the battery 11 through the key switch 12 and which, as a gate source for the first and second MOS.FET's 92a, 92b as the (+) side elements of the power MOS.FET unit 92, outputs to the power MOS.FET unit 92 a voltage higher by a gate voltage than the voltage of the battery 11, or a gate voltage that is about equal to the voltage of the battery 11, the output being electrically insulated. Numeral 95 is a microcomputer power source circuit having its input terminal connected to the battery 11 through the key switch 12; and 96 is a microcomputer to which power is supplied through the microcomputer power source circuit 95. This microcomputer 96 inputs a steering torque signal from the steering torque sensor 2 through a steering torque signal input circuit 97 which constitutes an input I/F circuit, and also inputs a vehicle speed signal from the vehicle speed sensor 10 through a vehicle speed signal input circuit 98 which constitutes an input I/F circuit. Numeral 99 designates a fail-safe relay drive circuit which inputs a decision signal as to whether an abnormal condition is present or not that represents the result of operation based on the steering torque signal and vehicle speed signal inputted to the microcomputer 96, and which drives the fail-safe relay 91 through its output terminal connected to the other end of the drive coil 91a. Numeral 100 is a rightward motor drive circuit which outputs a drive signal for instructing the rightward turn of the DC motor 13 according to the result of operation of the microcomputer 96 based on the input of the steering torque signal; and 101 is a leftward motor drive circuit which, contrary to the rightward motor drive circuit 100, outputs a drive signal for instructing the leftward turn of the DC motor 13. Numeral 102 is a motor current command circuit which carries out digital/analog conversion of a digital signal inputted thereto that represents the result of operation of the microcomputer 96 based on the steering torque signal and vehicle speed signal and which outputs an analog voltage corresponding to an instruction current value for the DC motor 13; and 103 is a motor current detection circuit for detecting a potential difference produced in the shunt resistance 93, thereby detecting the magnitude of a current in the DC motor 13. Numeral 104 is a comparator having a non-inverting input terminal connected to an output terminal of the motor current command circuit 102 and an inverting input terminal connected to an output terminal of the motor current detection circuit 103, and which compares outputs of the circuits 102 and 103. Numeral 105 is a first two-input type AND gate which outputs to the power MOS.FET unit 92 a rightward motor drive signal based on the product of the output of the comparator 104 and the output of the rightward motor drive circuit 100, to thereby turn on the first and fourth MOS.FET's 92a, 92d; and 106 is a second two-input type AND gate which outputs to the power MOS.FET unit 92 a leftward motor drive signal based on the product of the output of the comparator 104 and the output of the leftward motor drive circuit 101, to thereby turn on the second and third MOS.FET's 92b, 92c. Numeral 107 designates an electromagnetic clutch drive circuit for intermittently controlling the electromagnetic clutch 16 on the basis of instructions of the microcomputer 96.

Next, the manner of operation of the present embodiment will be explained. When starting the engine, the key switch 12 is turned on and power is supplied from the batter 11 to the microcomputer power source circuit 95 and the gate power circuit 94 through the key switch 12 so that the microcomputer 96 starts operation and the gate power circuit 94 supplies gate power to the first and second MOS.FET's 92a, 92b of the power MOS.FET unit 92. Upon its start of operation, the microcomputer 96 fetches a steering torque signal from the steering torque sensor 2 and a vehicle speed signal from the vehicle speed sensor 10 respectively through the steering torque signal input circuit 97 and the vehicle speed signal input circuit 98, and as a result of its operation of the signals, the microcomputer 96, if its decision is that nothing abnormal is present in the both sensors 2 and 10, instructs the fail-safe relay drive circuit 99 to energize the drive coil 91a of the fail-safe relay 91. In response to this instruction, the fail-safe relay drive circuit 99 turns the fail-safe relay 91 on, whereupon the normally open contact 91b is closed so that power is supplied from the battery 11 to the electromagnetic clutch 16 through the fuse 18 and the contact 91b. An ON instruction is also issued from the microcomputer 96 to the electromagnetic clutch drive circuit 107, and accordingly current flows in the order of the battery 11→ the fuse 18→ the normally open contact 91b→ the electromagnetic clutch 16→ the electromagnetic clutch drive circuit 107; thus, the electromagnetic clutch 16 is operated and the wormwheel shaft 15 is mechanically brought into engagement with the second pinion shaft 17. In this condition, however, the steering torque sensor 2 is outputting a non-steering torque signal (a signal indicating a steering torque being in a neutral position, either rightward nor leftward) if the driver not shown is not turning the steering wheel 1; therefore, as a result of operation of the microcomputer 96, a non-drive instruction is given to both the rightward motor drive circuit 100 and the leftward motor drive circuit 101, and an instruction of motor current zero is given to the motor current command circuit 102. As such, the power MOS.FET unit 92 allows no current flow to the motor 13, and the steering wheel 1 has no auxiliary load applied thereto.

Subsequently, if the driver not shown turns the steering wheel to right (or left), a steering torque is transmitted to the steering torque sensor 2 through the first steering shaft 4a, and accordingly the steering torque sensor 2 issues an electric signal proportional to the steering torque in the right (or left) direction. The steering torque is then transmitted to the first tooth portion 6a of the rack shaft 6 through the second steering shaft 4b, the first universal joint 3a, the third steering shaft 4c, the second universal joint 3b, and the pinion shaft 5, and thus the rotary motion is converted into linear motion.

Meanwhile, the electric signal from the steering torque sensor 2 is inputted to the microcomputer 96 through the steering torque signal input circuit 97 of the control unit 9. An electric signal from the vehicle speed sensor 10 which is of a magnitude corresponding to the speed of vehicle run is also inputted to the microcomputer 96 through the vehicle speed signal input circuit 98 of the control unit 9. On the basis of the result of its operation with respect to the steering torque signal and vehicle speed signal, the microcomputer 96 issues a drive instruction to the rightward motor drive circuit 100 (on the leftward motor drive circuit 101), and accordingly the rightward motor drive circuit 100 (or the leftward motor drive circuit 101) outputs an "H" level (hereinafter referred to as "H") signal. Further, microcomputer 96 outputs to the motor current command circuit 102 a digital signal equivalent to the motor current. Accordingly, the motor current command circuit 102 converts the digital signal into an analog signal by means of a digital/analog converter therein and outputs the analog signal to the (+) side input terminal of the comparator 104. At this moment there is no current flowing in the DC motor 13; therefore, no potential difference is present in the shunt resistance 93 and the output of the motor current detection circuit 103 is zero. Hence, the "H" output of the comparator 104 and the "H" output of the rightward motor drive circuit 100 (or the leftward motor drive circuit 101), are inputted to the first AND gate 105 (or the second AND gate 106) which in turn outputs "H" to the power MOS.FET unit 92 so that the first and fourth MOS.FET's 92a, 92d (or the second and third MOS.FET's 92b, 92c) are caused to conduct in such direction as to turn the DC motor 13 rightward (or leftward). Thereupon, current flows through the route of battery 11→ fuse 18→ first MOS.-FET 92a (or third MOS.FET 92c)→ DC motor 13→ fourth MOS.FET 92d (or second MOS.FET 92b)→ shunt resistance 93, and accordingly the DC motor 13 produces a rotational torque. By this motor current there is caused a potential difference in the shunt resistance 93, which is amplified in the motor current detection circuit 103 and then fed back to the (−) side input terminal of the comparator 104. If this feedback voltage exceeds the output voltage of the motor current command circuit 102, the output of the comparator 104 is lowered to an "L" level (hereinafter referred to as "L", and accordingly the output of the first AND gate 105 (or the second AND gate 106) which ahs been at "H" is lowered to "L" so that the first MOS.FET 92a (or the third MOS.FET 92c) and/or the fourth MOS.FET 92d (or the second MOS.FET 92b) is cut off. Thus, current supply of the DC motor 13 which has been energized is cut off and accordingly the potential difference in the shunt resistance 93 is reduced to zero. By repeating the above described procedure of operation the amount of current in the DC motor 13 is controlled to such amount of current as may be specified by the microcomputer 96. Irrespective of its rotational speed, the DC motor 13 produces a torque generally proportional to such controlled amount of current. The torque produced by the DC motor 13 is reduced by the worm shaft 14 and the worm wheel 15 and the reduced torque is transmitted to the pinion shaft 17 through the electromagnetic clutch 16 which is in engagement therewith through excitation. The reduced torque is further transmitted to the second tooth portion 6b of the rack shaft 6 and the rotational motion represented by it is converted into linear motion. The direction of the force so converted into linear motion is so set as to agree with that of a force to linear motion converted from a steering torque applied by the driver on the steering wheel 1 through his steering manipulation. This means that an auxiliary force is applied to the steering wheel, so the auxiliary force operates to decrease the steering torque as sensed by the steering torque sensor 2. Thus, the output of steering torque sensor 2 is reduced and the steering torque of the driver is reduced. If, in this case, any abnormal condition occurs with respect to the vehicle speed sensor 10, the steering torque sensor 2, or the wiring in the vehicle, the microcomputer 96 issues an OFF instruction to the fail-safe drive circuit 99 on the basis of the result of its operation, so that the fail-safe drive circuit 99 turns the fail-safe relay 91 off to thereby open the normally open contact 91b which has been closed. Accordingly, power supply from the battery 11 to the electromagnetic clutch 16 is cut off, whereupon the electromagnetic clutch 16 is turned off and operates to disengage the second pinion shaft 17 and the worm wheel shaft 15 from each other for return to a manual steering position. In such case, needless to say, the microcomputer 96 issues an OFF instruction to the electromagnetic clutch drive circuit 107, the rightward motor drive circuit 100, and the leftward motor drive circuit 101; accordingly, the respective outputs of AND gates 105, 106 are lowered to "L" and current supply to the power MOS.FET unit is cut off. In this way, safety can be assured from various angles.

If a short-circuit trouble occurs with the power MOS.FET unit 92, overcurrent flows across the fuse 18 so that the fuse 18 is subjected to fusing, there being thus no possibility of the DC motor 13 being allowed to run freely.

According to the invention, as above described, a fail-safe relay having a normally open contact is provided on a line for supplying power to the electromagnetic clutch so that under an abnormal condition such as breakage in the power supply wiring, the electromagnetic clutch is shut off because of de-energization of the fail-safe relay and no auxiliary steering force is applied. Thus, changeover to the mode of manual steering automatically takes place, whereby any possible danger of an extremely heavy load being applied to the steering wheel can be positively prevented. Furthermore, voltage from the battery is directly applied on the motor drive power MOS.FET unit through the fuse. According to this arrangement, the fail-safe relay can be of a smaller size and of a smaller capacity, and further it can be of less noise trouble and of less cost. A further advantage is that the possibility of power loss due to a voltage drop caused by fail-safe relay contacts is eliminated.

What is claimed is:

1. A motor-driven power steering system including a control unit (9) for controlling the rotational force of a DC motor (13) as an auxiliary steering force on the basis of a steering torque signal from a steering torque sensor (2) which detects the rotational force of a steering wheel and on the basis of a vehicle speed signal from a vehicle speed sensor (10) which detects the running speed of a vehicle and for turning an electromagnetic clutch (16) on and off in order to effectively and ineffectively control, respectively, the rotational force of said DC motor as said auxiliary steering force, wherein the motor-driven power steering system further includes a fail-safe relay (91) having a normally open contact which is disposed on a line for supplying power to said electromagnetic clutch, one end of a drive coil (91a) of said fail-safe relay being connected to a positive terminal of a battery source (11) through a key switch (12), the other end of said drive coil being connected to a fail-safe drive means (99) which disconnects said drive coil from receiving power if said control unit detects that an abnormal condition is present on the basis of said steering torque signal and said vehicle speed signal, and a motor drive circuit (92), connected to the positive terminal of the battery source through a fuse (18), for supplying power to said DC motor.

2. A motor-driven power steering system for a vehicle having a steering wheel, the system comprising:
   a DC motor (13);

a steering torque sensor (2) for sensing a rotational force of the steering wheel;
a vehicle speed sensor for sensing a running speed of the vehicle;
an electromagnetic clutch (16);
a control unit (9) for controlling the rotational force of said DC motor as an auxiliary force in accordance with outputs of said steering torque sensor and said vehicle speed sensor, and for turning said electromagnetic clutch on and off, thereby controlling the application of the rotational force of said DC motor as the auxiliary force;
a battery source having positive and negative terminals;
a fail-safe relay (91) having a normally opened contact (91b) disposed on a power line which supplies power to said electromagnetic clutch, and having a drive coil (91a), one end of said drive coil being connected to the positive terminal of said battery source through a key switch (12);
fail-safe drive means (99), connected to the other end of said drive coil, for preventing said drive coil from receiving power when said control unit detects an abnormal condition determined in accrodance with the outputs of said steering torque sensor and said vehicle speed sensor;
a motor drive circuit (92), connected between the positive terminal of said battery source and said DC motor; and
a fuse (18) connected between said positive terminal of said battery source and said motor drive circuit, whereby said fuse prevents current flow to said motor drive circuit and to said DC motor when a short circuit occurs in said motor drive circuit.

3. The motor-driven power steering system as defined in claim 1, wherein said motor drive circuit comprises a plurality of MOS transistors (92a-92d).

4. The motor-driven power steering system as defined in claim 1, further comprising a microcomputer (96) for receiving the steering torque signal and the vehicle speed signal, a rightward motor drive circuit (100) for outputting a rightward turn-drive signal for said DC motor, and a leftward motor drive circuit (101) for outputting a leftward turn drive signal for said DC motor, said microcomputer controlling said fail-safe drive means, said rightward motor drive circuit and said leftward motor drive circuit.

5. The motor-driven power steering system as defined in claim 3, further comprising an electromagnetic clutch drive circuit (107), said microcomputer controlling said electromagnetic clutch drive circuit.

6. The motor-driven power steering system as defined in claim 1, wherein said motor drive circuit comprises first, second, third and fourth MOS transistors.

7. The motor-driven power steering system, as defined in claim 6, wherein said first and second transistors are connected in series to form a first pair of transistors, and said third and fourth transistors are connected in series to form a second pair of transistors, said first and second pairs of transistors being connected in parallel between the positive terminal of said battery source and ground.

* * * * *